United States Patent [19]

Brouwer

[11] Patent Number: 4,621,696
[45] Date of Patent: Nov. 11, 1986

[54] PIVOT MECHANISM FOR SOD CUTTING MACHINE

[75] Inventor: Gerardus J. Brouwer, Keswick, Canada

[73] Assignee: Brouwer Turf Equipment Limited, Keswick, Canada

[21] Appl. No.: 594,000

[22] Filed: Mar. 27, 1984

[30] Foreign Application Priority Data

Feb. 20, 1984 [CA] Canada ................................. 447786

[51] Int. Cl.⁴ ............................................ A01B 45/04
[52] U.S. Cl. .................................... 172/20; 172/117; 56/16.2
[58] Field of Search .................... 56/16.2, 121.46, 209; 172/19, 20, 459, 460, 657, 714, 743, 797; 37/3, 238, DIG. 20; 280/104, 492, 772, 112 A

[56] References Cited

U.S. PATENT DOCUMENTS

| | | | |
|---|---|---|---|
| 905,985 | 12/1908 | Clove | 56/209 |
| 2,709,329 | 5/1955 | Neal | 56/209 |
| 3,509,944 | 5/1970 | Brouwer et al. | 172/20 |
| 3,590,927 | 7/1971 | Brouwer | 172/19 |
| 3,807,504 | 4/1974 | Nunes | 172/19 X |

FOREIGN PATENT DOCUMENTS 570108 2/1933 Fed. Rep. of Germany ... 280/112 A

Primary Examiner—Robert A. Hafer
Assistant Examiner—Terrence L. B. Brown
Attorney, Agent, or Firm—Rogers, Bereskin & Parr

[57] ABSTRACT

A sod harvesting machine travels forwardly along a path of travel and has a sod cutting head pivotally connected to a fixed rear frame by a horizontal front pivot shaft having its axis aligned along the path of travel and located close to the ground, and by a pair of rear pivots. The rear pivots are formed by a pair of curved tracks and rollers at the rear of the cutting head, well above the ground, allowing the front of a conveyor to be brought near the ground and close behind the sod cutting knife. The curved tracks have a common center of curvature located on the axis of the front pivot shaft so that they have the same effect as a horizontal rear pivot shaft located close to the ground and aligned with the front pivot shaft.

8 Claims, 5 Drawing Figures

PIVOT MECHANISM FOR SOD CUTTING MACHINE

This invention relates to an improved sod harvesting machine.

Sod harvesting machines as shown in U.S. Pat. No. 3,509,944 entitled "Sod Cutting Apparatus" and issued on May 5, 1970 to G. J. Brouwer et al, have been used for some years. Such sod harvesting machines have proven very successful in practice, but they have a disadvantage. The disadvantage is that the entire sod harvesting machine, including the sod cutting head and the conveyor, are pivoted as a rigid unit to the support and propulsion vehicle by front and rear pivots whose axes are aligned in the rearwardly and upwardly slanting line. It has been found that under certain conditions this arrangement did not adequately follow small irregularities in the ground and would sometimes tend to scalp very thin sod.

Accordingly, it is an object of the invention to provide a unique pivoting arrangement which improves the manner in which the sod cutting head tracks the contours of the ground over which it travels. In its broadest aspect the invention provides a sod harvesting machine adapted for travel forwardly along a path of travel and having:

(a) a sod cutting head comprising a first frame, a roller mounted on said first frame, and a sod cutting knife mounted on said first frame behind said roller for undercutting a strip of sod, (b) a second frame located behind said sod cutting head and extending rearwardly therefrom, (c) a conveyor mounted on said second frame and having its forward end positioned behind said undercutting knife to receive sod cut by said knife and to convey such sod therefrom, (d) said first frame and said second frame being connected at a first pivotal connection located forwardly of said roller and near the ground, said first pivotal connection having its pivotal axis oriented substantially horizontally and in the direction of said path of travel, (e) second and third connection means connected between said first and second frames rearwardly of and above said undercutting knife and spaced laterally apart, each said connection means comprising a curved guide connected to one of said first and second frames and guided means connected to the other of said first and second frames and being guided by said curved guide so that said first frame may pivot from side to side on said second frame, (f) and stop means connected between said first and second frames for limiting the extent of said pivoting.

Further objects and advantages of the invention will appear from the following description, taken together with the accompanying drawings in which.

Figure 1:
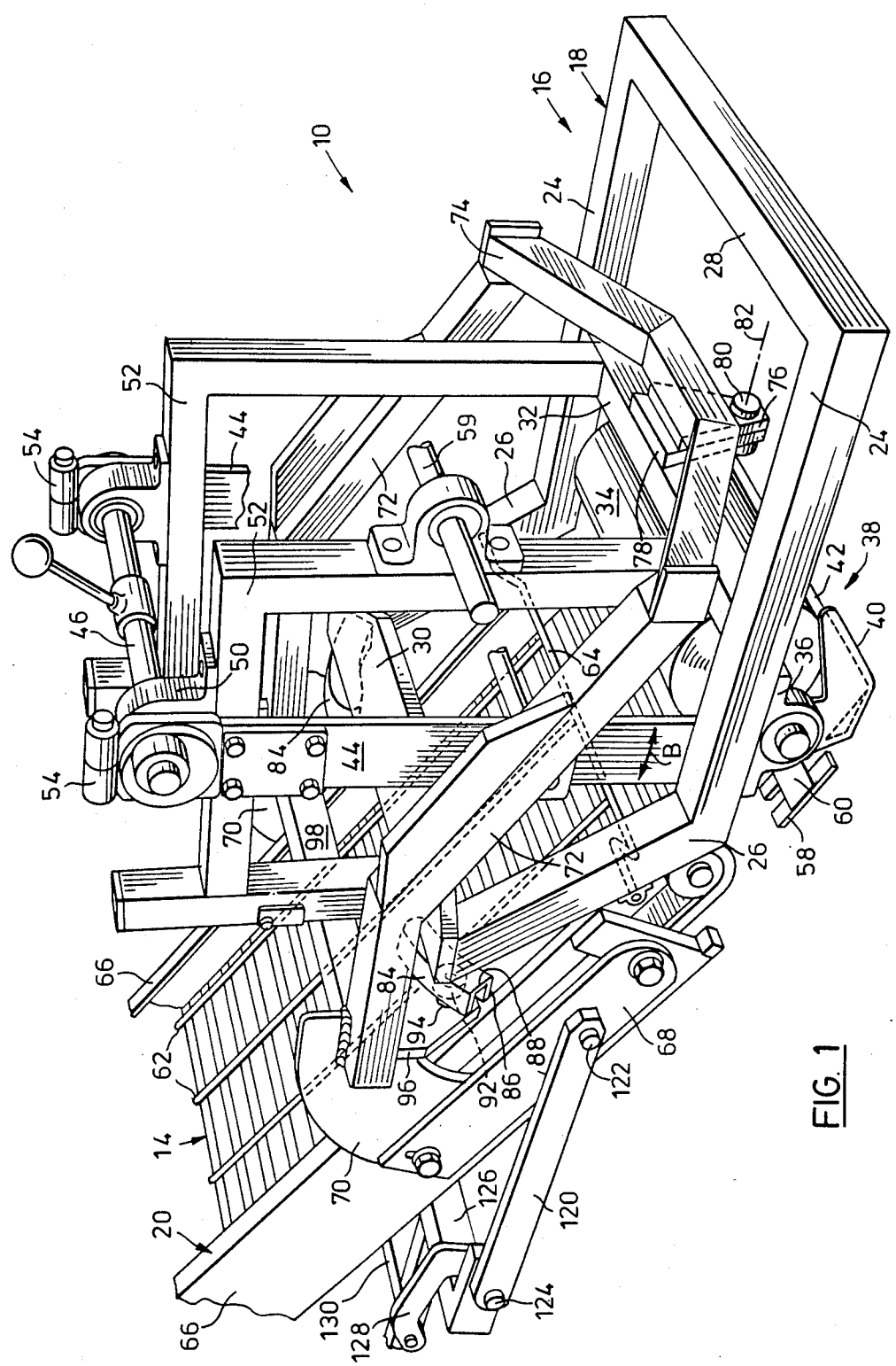
FIG. 1 is a perspective view showing a sod harvesting machine according to the invention.

Reference is first made to FIG. 1, which shows a sod harvesting machine generally indicated at 10. The sod harvesting machine 10 is essentially the same as that shown in the above-mentioned U.S. patent, except for the pivoting sod cutting head to be described. Since the invention relates to the pivoting mechanism, and since the basic mechanism for cutting sod and conveying it upwardly and rearwardly is well known, and is described, for example, in the above-mentioned U.S. patent, such sod cutting and conveying mechanism will here be described only briefly.

As shown, the sod harvesting machine 10 is adapted for travel forwardly along a path of travel indicated by arrow A, to undercut a strip of sod 12 (FIG. 2) and to convey the cut strip upwardly and rearwardly along a conveyor 14. The sod harvesting machine 10 includes a sod cutting head 16 having a frame 18. The frame 18 is pivotally mounted (by means to be described) to a rear frame 20 which supports the conveyor 14 and which extends upwardly and rearwardly from the sod cutting head 16. The rear frame 20 is adapted to be mounted to a support and propulsion vehicle such as a tractor, a wheel of which is indicated at 22 in FIG. 3.

The frame 18 of the sod cutting head 16 includes a pair of laterally spaced side members 24 having rear sections 26 which slant upwardly and rearwardly. The side members 24 are joined at their front by a front cross-member 28, and at their rear (at the tops of the slanting sections 26) by a rear cross-member 30. The side members 24 are also joined intermediate their length by a mid cross-member 32.

Figure 2:
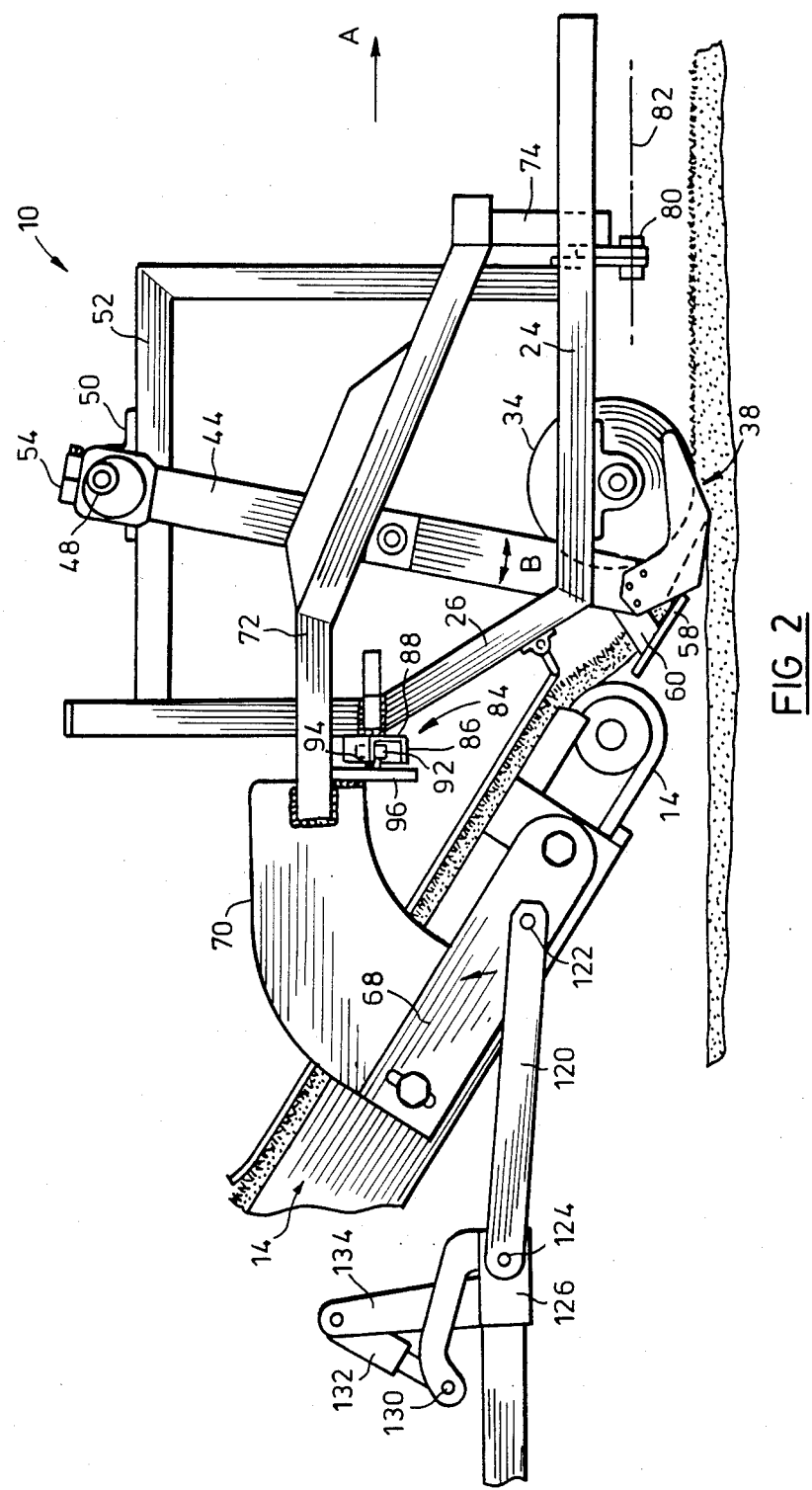
FIG. 2 is a side view of the sod harvesting machine of FIG. 1.

A roller 34 for rolling the sod to be cut is transversely mounted between the side member 24 by pillow blocks 36. A sod cutting knife 38, having side cutting blades 40 and an under-cutting blade 42 extending between the side cutting blades, is mounted immediately behind and below the roller 34 to cut the edges and beneath a strip of sod. The knife 38 is mounted by a pair of arms 44 which extend upwardly and are supported at their upper ends by a cross shaft 46 eccentrically connected to bearings 48 at the upper ends of the arms 44. The cross shaft 46 is mounted in pillow blocks 50 supported on raised members 52 which form part of the head frame 18. The cross shaft 46 is normally clamped by clamps 54 which can be loosened so that handle 56 can be moved to adjust the angular position of the cross shaft, thereby raising or lowering the arms 44. This raises or lowers the cutting knife 38, thereby adjusting the thickness of the sod being cut. As the harvester 10 moves forwardly, the arms 44 are reciprocated forwardly and rearwardly in the direction of arrow B by conventional driving means (not shown but shown and described in the above-mentioned Canadian patent) to undercut below and at the edges of a strip of sod 12 as indicated in FIG. 2.

The strip of sod 12 is periodically severed laterally by a conventional cross-cut blade, not shown but which may be mounted on the head 16 in a manner similar to that shown in the above-mentioned U.S. patent. The cross cut blade is typically, as shown on that patent, activated by a cam (not shown) carried by shaft 59 pivotally mounted on the frame 18.

The cut sod 12 is guided rearwardly from the cutting knife 38 by a set of parallel rearwardly extending conventional guide strips 58 located just behind the knife 38. The strips 58 are supported by arms 60 connected to the knife support arms 44, essentially as shown in said U.S. patent. The cut sod emerging from the guide strips 58 is caught by the conveyer 14 and conveyed upwardly and rearwardly to a station (not shown) on the harvester where it is rolled, slabbed, or otherwise dealt with as desired. A set of flexible steel rods 62 overlie the conveyer 14 near its lower end and prevent the cut sod from curling over and rolling back into the sod cutting head 16. The rods 62 are connected to a transverse rod 64 mounted on the side frame rear sections 26.

The sod cutting head 16 is mounted on the rear frame 20 as follows. The rear frame 20 includes a pair of main channel side members 66 having side plates 68 bolted to their lower ends. Welded to the side plates are upwardly and forwardly extending plates 70, to which are connected forwardly and downwardly extending side box members 72. A generally V-shaped front cross member 74 is connected to the fronts of the box members 72.

Figure 3:
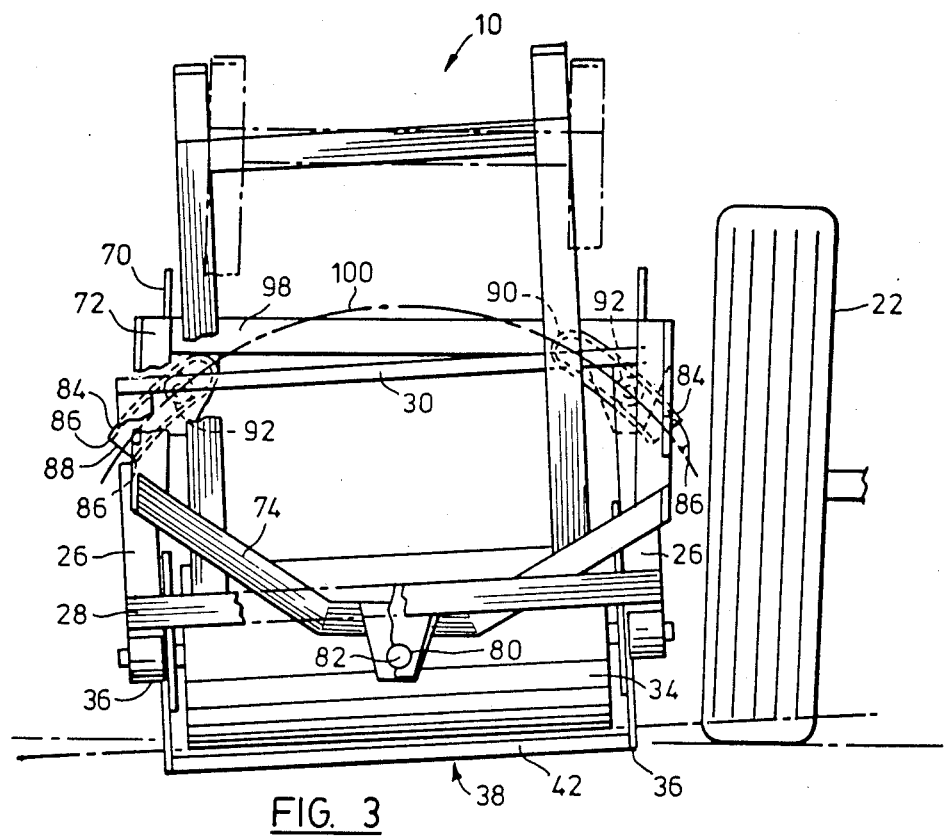
FIG. 3 is a front view showing the sod harvesting machine of FIG. 1.

Welded to the center of the front cross member 74 is a downwardly extending plate 76. The plate 76 lies just ahead of a corresponding downwardly extending plate 78 welded to the mid-cross member 32 of the cutting head frame 16. A pivot shaft 80 extends between the two plates 76, 78 and has its axis 82 extending horizontally forwardly and rearwardly, thereby allowing pivoting of the sod cutting head 16 about the axis 82. As best shown in FIGS. 2 and 3, the axis 82 of pivot shaft 80 is located as close to the ground as possible, to optimize tracking by the roller 34 and the sod cutting knife 38 of the contours of the ground.

The rear of the sod cutting head 16 is pivoted to the rear frame 20 as follows. Two curved tracks 84 are welded one to each side of the rear cross member 30. Each track 84 is formed by a U-shaped channel having side flanges 86 and a connecting web 88. As best shown in FIG. 3, the tracks 84 are of circular contour and are mounted so that they have a common center of curvature on the axis 82 of the front pivot shaft 80. The inner opposing ends of the tracks 84 are closed by the flanges 86 which extend inwardly in a circular contour to meet each other in a curved closed end 90 (FIG. 3).

Rollers 92 are located in the tracks 84, the rollers being rotatably mounted on shafts 94. The shafts 94 are fixed to downwardly extending plates 96 welded to a rear frame cross member 98. Cross member 98 is in turn welded to plates 70.

In operation, as the roller 34 encounters small bumps which cause one side of the roller to rise with respect to the other (as shown in FIG. 3), the sod cutter head 16 is able to pivot about the front pivot shaft 80. At this time the curved tracks 84 move with respect to the rollers 92 in the circular path shown by dotted line 100 in FIG. 3. The curved tracks 84 and rollers 92 have the same effect as would a horizontal rear pivot shaft having its axis coincident with axis 82 of the front pivot shaft 80. The curved tracks 84 and rollers 92 thereby allow accurate tracking by the sod cutting head 16 of small irregularities in the ground.

Figure 4:
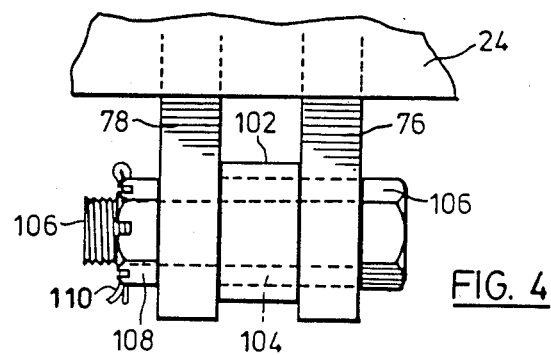
FIG. 4 is a view of a front pivot for the machine of FIG. 1.

Although in FIG. 1 the plates 76, 78 are shown as overlying one another, in practice they are preferably spaced slightly apart as shown in FIG. 4 and are separated by a boss 102 welded to plate 76. Located within the boss 102 and plate 76 is a bushing 104 to provide a larger bearing surface for the front pivot. The pivot shaft 80 is constituted by a bolt 106 which extends through the bushing 104, through a hold in plate 78, and is held in place by a castle nut 108, and cotter pin 110.

As shown, the sod cutting head 16 is prevented from moving forwardly or rearwardly with respect to the main frame by the front pivot shaft 80. In addition, when the machine is operated the sod cutting head 16 tends to be forced rearwardly with respect to the rear frame 20, and such rearward forces are resisted by the track webs 88 which thrust rearwardly against the ends of the rollers 92. If desired, removable wear plates can be placed on the bottoms or tops of the track flanges 86 so that the entire track need not be replaced when wear occurs.

Because the tracks 84 and rollers 92 are located well above the undercutting knife 38, room is provided to bring the forward end of the conveyor 14 close to the ground and close to the rear end of the cutting knife 38. The close proximity of the forward end of the conveyor 20 to the cutting knife 38 helps to ensure that the thin cut sod (which can be extremely fragile) can bridge the gap from the cutting knife to the conveyor with a minimal risk of being torn or misdirected. At the same time although the rear pivots constituted by the curved tracks 84 and rollers 92 are well above the ground, they have, as mentioned, the effect of a single forwardly and rearwardly oriented horizontal pivot shaft located close to the ground and behind the knife 38, allowing accurate tracking by the sod cutting head of ground irregularities. In addition, it is found that the three point mounting arrangement shown provides good mechanical support for the sod cutting head 16 (which is subject to considerable stresses and continual vibration) and provides an extemely smooth pivoting action.

Figure 5:
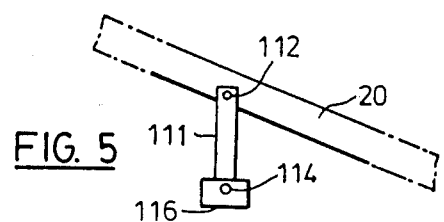
FIG. 5 is a side view showing the rear portion of the rear frame of the FIG. 1 machine.

When the sod harvester is to be moved from one cutting location to another, the head 16 must be raised clear of the ground. This is accomplished as follows, with reference to FIG. 5, which shows only the rear end of the conveyor frame 20. (The rear end of the conveyor frame is not shown in any of the other drawings). As shown in FIG. 5, the rear end of conveyer frame 20 is mounted by two side arms 111 (of which only one is shown, FIG. 5) pivotally connected at 112 to the frame 20 and pivotally connected at 114 to a frame member 116. The frame member 116 is connected to or forms part of the vehicle, not shown. This allows the front of the conveyor to be raised and lowered in the arc indicated by arrow C, FIG. 5.

The front of the conveyor frame 20 is supported by a pair of side arms 120 (FIG. 1, 2) pivotally connected at 122 to the plates 68 and pivotally connected at 124 to a support beam 126 which is also connected to or which forms part of the vehicle. A lever arm 128 is fixed to each arm 120 through pivots 124, and the two lever arms 128 (of which only one is shown) are fixed to each other by a cross shaft 130. A hydraulic piston and cylinder 132 is connected between shaft 130 and an upstanding arm 134 fixed to beam 126. When piston and cylinder 132 is extended, side arms 128 are rotated counterclockwise about pivot 124 to raise the front end of frame 20, and with it head 16, clear of the ground.

Since the rear frame 20 is fixed against side to side pivoting (and in any event is pivotally connected to the cutting head 16), unbalanced side to side forces acting on the rear frame 20 (caused, for example, by sod rolling operations at its upper end) will not affect or cause the sod cutting head 16 to pivot.

The pivot axis 82 about which the cutting head 16 pivots is preferably located centrally widthwise of the roller 34 and cutting knife 38, for best tracking of the ground contours. However, if the cutting head 16 is unbalanced (e.g. because there are hydraulic motors or other parts which make one side heavier than the other), then the pivot axis 82 will normally be located laterally at the side to side balance line of the cutting head 16. This balance position will not normally be more than a few inches offset from the lateral centre line of the head 16 (for a cutter which cuts e.g. an 18 inch wide strip of sod).

Although the side to side pivoting mechanism shown for the head 16 has been described in connection with a sod cutting machine which is adapted to be connected to a vehicle such as a tractor, the same pivoting mechanism can be used in connection with a sod cutting machine which is itself a self-propelled vehicle.

I claim:

1. A sod harvesting machine adapted for travel forwardly along a path of travel and having:
   (a) a sod cutting head comprising a first frame, a roller mounted on said first frame, and a sod cutting knife mounted on said first frame behind said roller for undercutting a strip of sod,
   (b) a second frame located behind said sod cutting head and extending rearwardly therefrom,
   (c) a conveyor mounted on said second frame and having its forward end positioned behind said undercutting knife to receive sod cut by said knife and to convey such sod therefrom,
   (d) said first frame and said second frame being connected at a first pivotal connection located forwardly of said roller and near the ground, said first pivotal connection having its pivotal axis oriented substantially horizontally and in the direction of said path of travel,
   (e) second and third connection means connected between said first and second frames rearwardly of and above said undercutting knife and spaced laterally apart, each said connection means comprising a curved track portion connected to one of said first and second frames and a roller portion connected to the other of said first and second frames, the portion of each said connection means connected to said second frame guiding the portion of such connection means connected to said first frame so that said first frame may pivot from side to side on said second frame,
   (f) said curved track portions each having the contour of a section of a circle, said curved track portions together having a common center of curvature located below said curved track portions, said common center of curvature being behind said undercutting knife and substantially aligned with the axis of said first pivotal connection, said second and third connection means together having the effect of a pivot having its axis fixed with respect to said first and second frames and substantially coincident with the axis of said first pivotal connection,
   (g) and stop means connected between said first and second frames for limiting the extent of said pivoting.

2. A sod harvesting machine according to claim 1 wherein said first pivotal connection is located laterally substantially at the side to side balance point of said head.

3. A sod harvesting machine according to claim 2 wherein said first frame has a first cross member located in front of said roller, said second frame has a pair of side members extending forwardly over said undercutting knife and over said roller and having a pair of forward ends, and a second cross member connecting said forward ends, and support means connected between said first and second cross members for supporting said pivotal connection.

4. A sod harvesting machine according to claim 2 wherein said first frame has a first cross member located in front of said roller, said second frame has a pair of side members extending forwardly over said undercutting knife and over said roller and having a pair of forward ends, and a second cross member connecting said forward ends, and support means connected between said first and second cross members for supporting said pivotal connection, said support means comprising a pair of support members extending downwardly from said first and second cross members respectively, said first pivotal connection being between said downwardly extending support members.

5. A sod harvesting machine according to claim 1 wherein said first pivotal connection is located substantially centrally widthwise of said undercutting knife.

6. A sod harvesting machine according to claim 1 wherein each track portion is U-shaped in cross section, having a pair of side flanges and a connecting web, each roller portion being a roller located between said side flanges.

7. A sod harvesting machine according to claim 1 wherein said track portions are mounted on said first frame and said roller portions are mounted on said second frame.

8. A sod harvesting machine according to claim 2 wherein said first frame has a first cross member located in front of said roller, said second frame has a pair of side members extending forwardly over said undercutting knife and over said roller and having a pair of forward ends, and a second cross member connecting said forward ends, and support means connected between said first and second cross members for supporting said pivotal connection, said second frame being adapted to be connected to a support and propulsion vehicle.

* * * * *